United States Patent Office 3,482,867
Patented Dec. 9, 1969

3,482,867
HANDLE DEVICE
Herman Curtis Allen, Medfield, Mass., assignor to Bird & Son, Inc., East Walpole, Mass., a corporation of Massachusetts
Filed Feb. 6, 1968, Ser. No. 703,401
Int. Cl. A47j 45/10
U.S. Cl. 294—28         5 Claims

ABSTRACT OF THE DISCLOSURE

A handle for use with a cylindrical container and comprising three strips of flexible, elastic material pivotally secured together adjacent their ends.

---

This invention relates to handles and, more particularly, to handles for cylindrical containers.

It is a primary object of the invention to provide a handle that may be used with cylindrical containers of any material and which eliminates the need of mechanically or chemically attaching any handle supports to the container solely for the purpose of attaching a conventional handle thereto. Other objects include providing a handle that may easily be attached to or removed from a container and which may be collapsed for easy storage or shipment.

The invention accomplishes these and other objects by providing a handle comprising three longitudinally-extending strips of flexible, elastic material pivotally connected to each other at their ends by rivets. The strips are substantially equal in length, each having a length that is slightly more than ½ the circumference of the container with which the handle is to be used. The distance between the rivets is less than ½ the circumference of side wall container lip and is equal to or less than ½ that of the container.

Other objects will appear from the following detailed description of a preferred embodiment of the invention, taken together with the attached drawings, in which.

Figure 1:
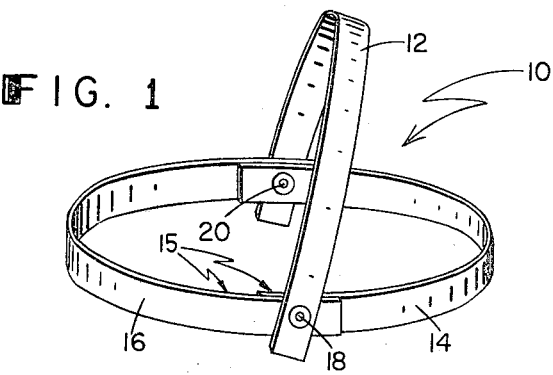
FIG. 1 is a perspective view of a handle constructed in accord with the present invention.
Figure 2:
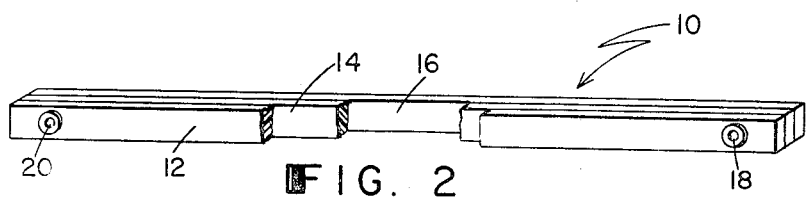
FIG. 2 is a perspective view, partially in section, of the handle of FIG. 1 in its collapsed condition.

Referring more particularly to the drawings, there is shown a handle 10 comprising three rectangular in cross-section, longitudinally-extending strips 12, 14, 16 of flexible, elastic material, such as rigid polyvinyl chloride. The three strips are of equal length and their adjacent end portions are pivotally connected by rivets 18, 20. The pivotal connections permit the strips to be moved relative to each other between the handle's collapsed position (FIG. 2) in which strips 12, 14, 16 lie side by side, and handle's open position (FIG. 1) in which strips 14 and 16 are placed end-to-end, thereby forming a generally circular band 15, and strip 12 extends upward generally perpendicularly to band 15 to provide a carrying portion.

Figure 3:
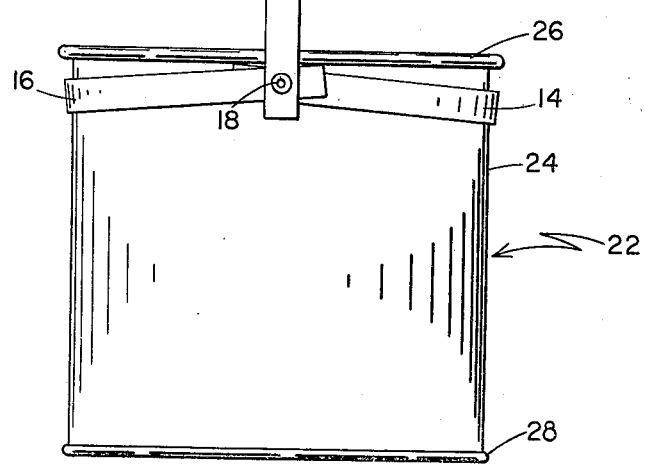
FIG. 3 is a plan view of the handle of FIG. 1 secured to a cylindrical container.

FIG. 3 illustrates handle 10 snapped in position over a conventional cylindrical container 22 of the type comprising a cylindrical side wall 24, typically of metal or paper composition, with metal lips 26, 28 at either end of the side wall for securing the container lid and bottom thereto. As shown, the circumference of lips 26, 28 is slightly greater than that of side wall 24.

In practice, the dimensions of all cylindrical containers of a given size, e.g. pint, quart, gallon, are standard and handle 10 is constructed to fit one standard size container. Each strip 12, 14, 16 is approximately 1/16 inch thick, ½ inch wide, and has a length ½ inch greater than half the circumference of the side wall 24 of the size container 22 with which it is intended to be used. The center-to-center distance between rivets 18, 20 is slightly less than one-half the circumference of lips 26, 28 so that band 15 has a circumference less than that of lips 26, 28, and, preferably, also slightly less than that of side wall 24. The flexibility and slight elasticity of the two strips 14, 16 forming band 15 permit the band to be snapped over lip 26 into the position shown in FIG. 3 wherein band 15 frictionally engages side wall 24 and the underside of lip 26.

When the container is lifted by means of strip 12, the portions of strips 14, 16 adjacent rivets 18, 20 may be drawn partially toward lip 26, pivoting the strips 14, 16 forming band 15 pivot slightly about rivets 18, 20 and causing the portions of the strips farthest the rivets to dig into side wall 24. Although it might be expected that drawing the strip portions adjacent the rivets partially toward lip 26 would decrease the container-engaging force of the handle, I have discovered that the accompanying pivotal motion actually results in an increase in the total force with which the handle engages the container.

What is claimed is:

1. A handle device for use with a container of the type having a cylindrical side wall and a cylindrical lip having a circumference not less than the circumference of said side wall, said handle device comprising:
   a pair of longitudinally-extending strips of flexible, elastic material,
   one end portion of one of said strips being pivotally connected to one end portion of the other of said strips, the other end portion of said one strip being connected to the other end connection of said other strip, and
   said strips being relatively movable about said pivotal connections to form a continuous band having a circumference that is slightly less than the circumference of said lip of said container,
   the elasticity of said strips being such that said band may be stretched and passed over said lip into engagement with said side wall of said container.

2. The handle device of claim 1 wherein said strips are of substantially equal length and the distance between said pivotal connections is one-half the circumference of said band.

3. The handle device of claim 2 including a third strip of flexible elastic material pivotally connected at its end portions to said end portions of said pair of strips.

4. The handle device of claim 3 wherein rivets provide said pivotal connections.

5. The handle device of claim 1 including three flexible, elastic strips of substantially equal length pivotally connected to each other at their opposite end portions by rivets, the distance between the center of the rivet forming one of said pivotal connections to the center of the rivet forming the other of said pivotal connections being no greater than the circumference of the side wall of said container.

References Cited

UNITED STATES PATENTS

| 1,827,221 | 10/1931 | Burrows | 294—28 |
| 2,743,129 | 4/1956 | Fredette | 294—28 |
| 3,050,326 | 8/1962 | Miller | 294—31.2 |

EVON C. BLUNK, Primary Examiner

ROGER S. GAITHER, Assistant Examiner

U.S. Cl. X.R.
294—31.2